Nov. 28, 1933. J. B. McGAUGHY Re. 19,009
GAS ORIFICE METER CHART CALCULATING MACHINE
Original Filed May 23, 1928 4 Sheets-Sheet 1
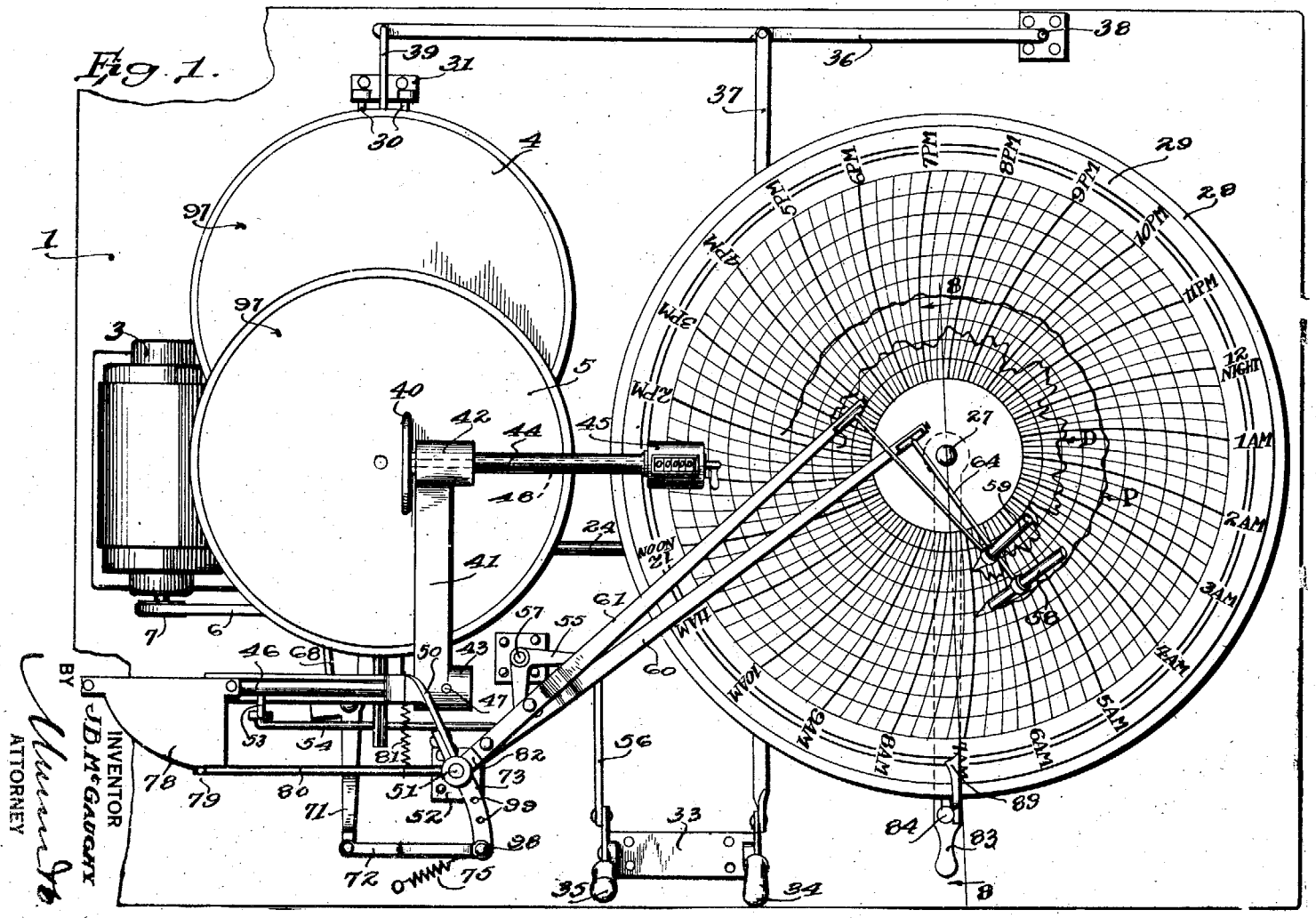

GAS ORIFICE METER CHART CALCULATING MACHINE
Original Filed May 23, 1928 4 Sheets-Sheet 2
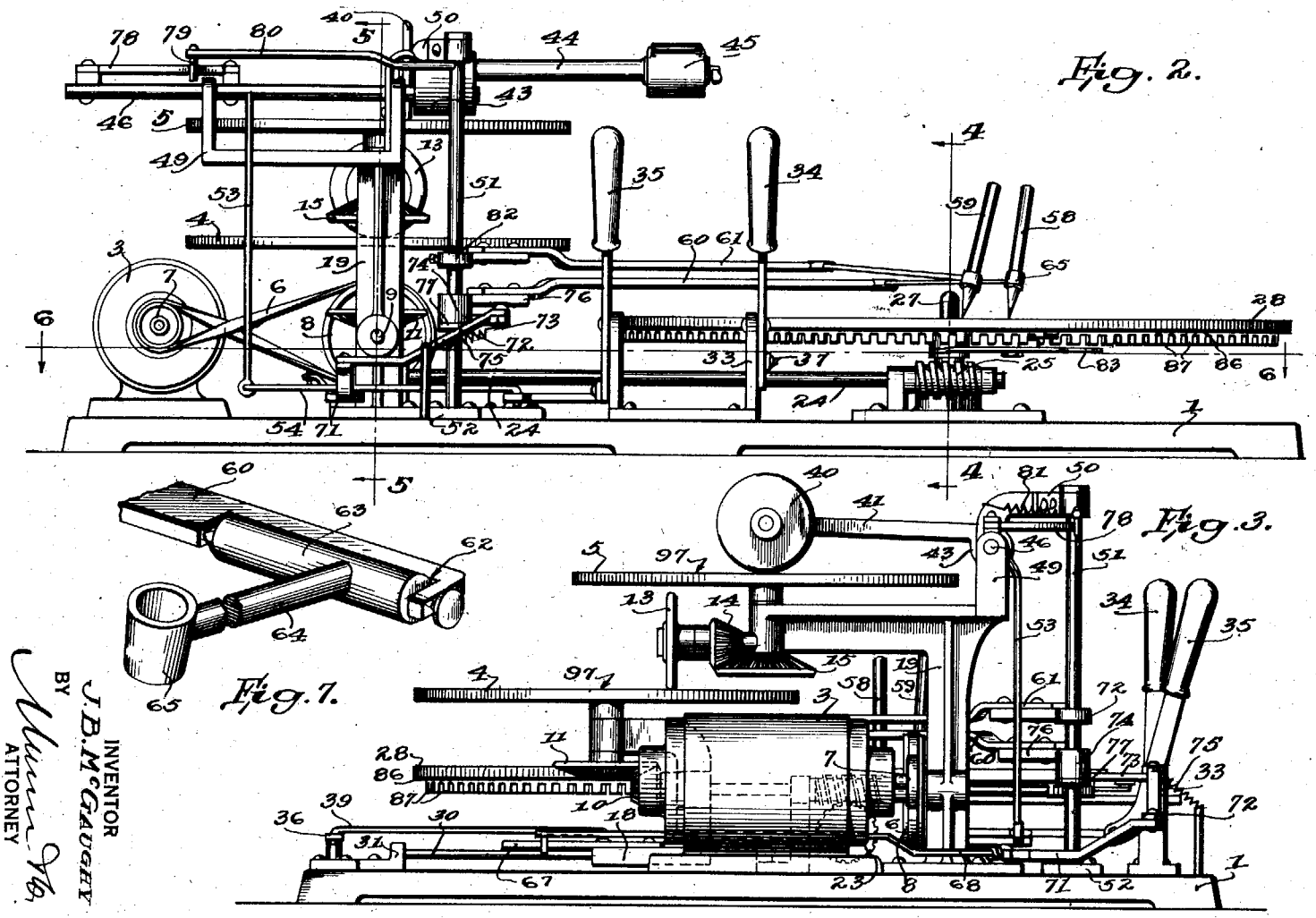
INVENTOR
J. B. McGAUGHY
BY
ATTORNEY Nov. 28, 1933. J. B. McGAUGHY Re. 19,009

GAS ORIFICE METER CHART CALCULATING MACHINE

Original Filed May 23, 1928 4 Sheets-Sheet 3

INVENTOR
J. B. McGAUGHY
BY
ATTORNEY

Nov. 28, 1933. J. B. McGAUGHY Re. 19,009

GAS ORIFICE METER CHART CALCULATING MACHINE

Original Filed May 23, 1928 4 Sheets-Sheet 4

J. S. Schrott

INVENTOR
J. B. McGAUGHY
BY
ATTORNEY

Reissued Nov. 28, 1933

Re. 19,009

UNITED STATES PATENT OFFICE 19,009

GAS ORIFICE METER CHART CALCULATING MACHINE

John B. McGaughy, Tulsa, Okla., assignor to Pittsburgh Equitable Meter Company, Pittsburgh, Pa., a corporation of Pennsylvania Original No. 1,748,783, dated February 25, 1930, Serial No. 279,942, May 23, 1928. Application for reissue October 12, 1931. Serial No. 568,484

32 Claims. (Cl. 235—61)

This invention relates to improvements in computing or calculating machines, and it consists of the constructions, combinations and arrangements herein described and claimed.

An object of the invention is to provide a machine to supplant clerical aids in calculating gas orifice meter charts after they have been received from the field, in other words, a machine by which the pressure and differential curves of such charts are employed as indices for the production of a computation of the quantity of fuel that has passed through an orifice during any determined period.

Another object of the invention is to provide a machine by which the ordinarily laborious mathematical processes for the achievement of the desired result are eliminated, the so-called calculation of an orifice meter chart being rapidly completed with a degree of accuracy ordinarily not obtainable by similar known devices.

A further object of the invention is to calculate from the pressure and differential curves of a meter chart the so-called "extension" which, upon application of a co-efficient, produces a product in thousands of cubic feet.

Figures 4, 5, 8:
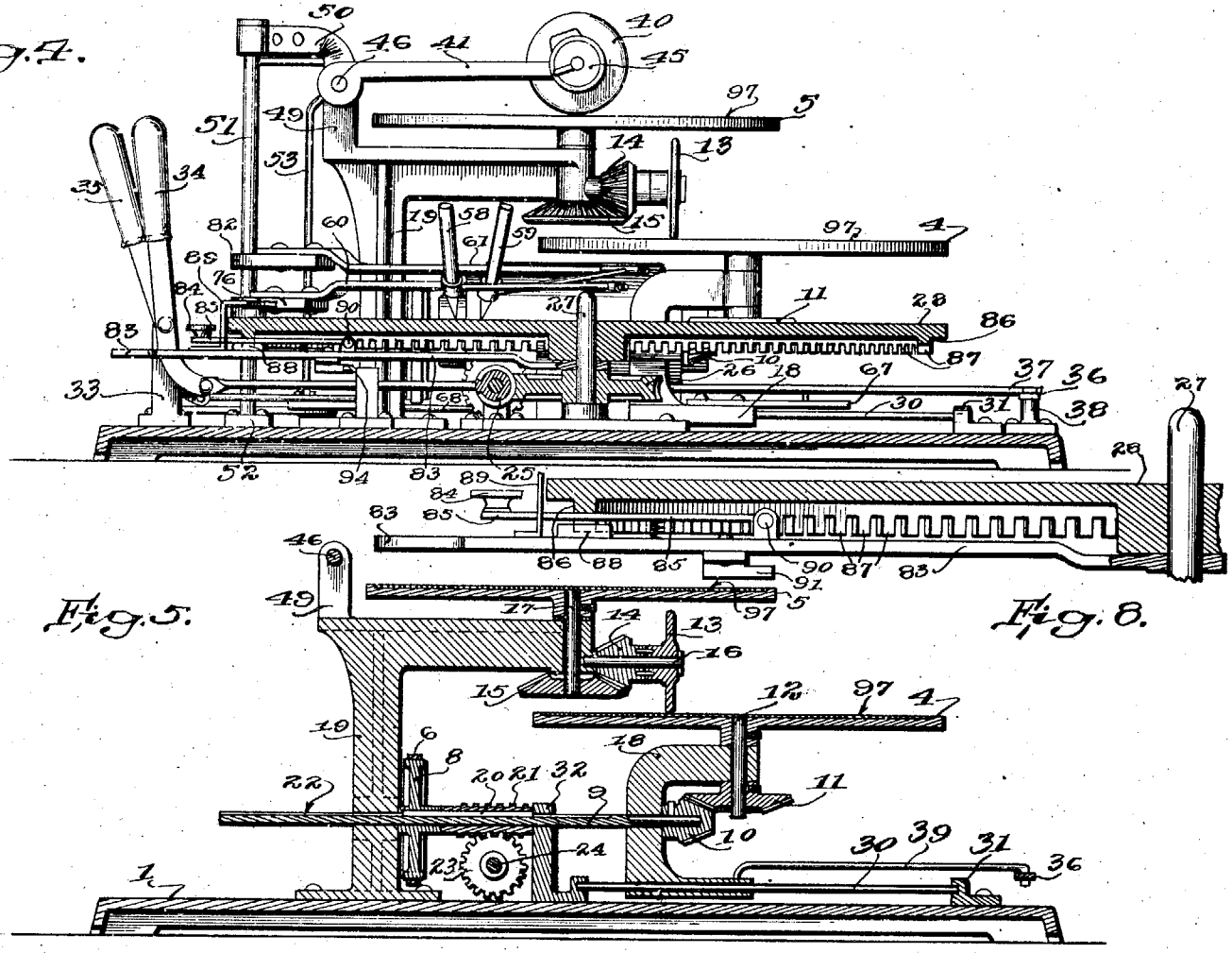
Figure 6:
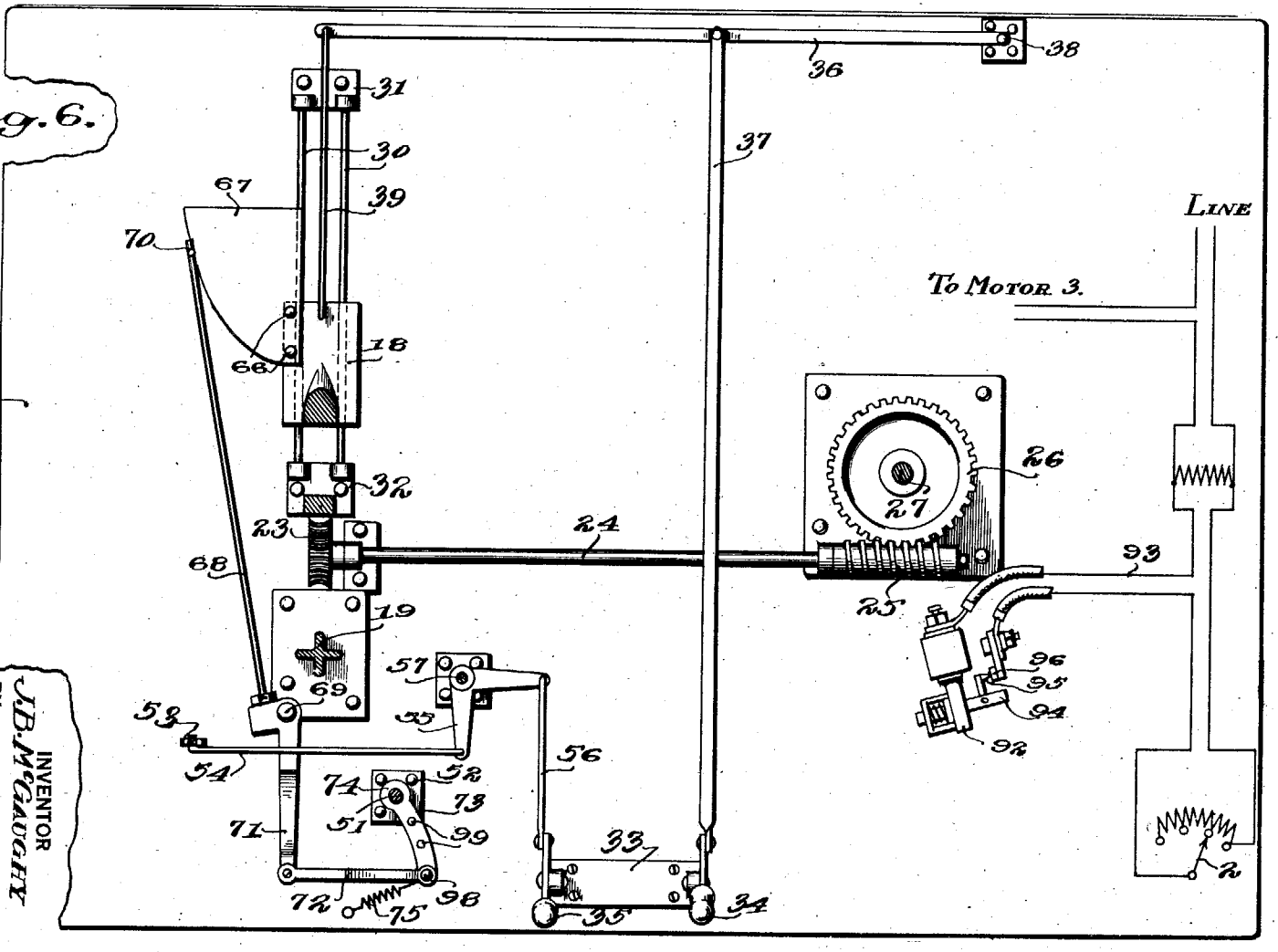

Other objects and advantages appear in the following specification, reference being had to the accompanying drawings in which, Figure 1 is a plan view of the improved gas orifice meter chart calculating machine, Figure 2 is a front elevation thereof, Figure 3 is an elevation of the left end, Figure 4 is a cross section taken on the line 4—4 of Figure 2, Figure 5 is a cross section taken on the line 5—5 of Figure 2, Figure 6 is a horizontal section taken on the line 6—6 of Figure 2, Figure 7 is a detail perspective view of one of the pencil holders, Figure 8 is a cross section taken on the line 8—8 of Figure 1, particularly showing the main control handle.

As has been briefly indicated already, the herein disclosed machine is intended to receive a chart on which pressure and differential curves have been inscribed by the operation of a known orifice meter during a given period, whereupon the machine is set in operation to decipher or integrate said curves or in other words, to produce a direct reading on a counter which is some known multiple of the extension of the chart.

It is deemed a sufficient identification of the mathematical formula customarily used for the calculation of orifice meter charts to say that the desired extension, the obtaining of which is the object of this machine, comprises the value of $$\sqrt{(P+14.4)D}$$

in which

P equals the static pressure in pounds per square inch in the pipe line below the orifice.

D equals a differential pressure on opposite sides of the orifice of the meter measured in inches of water, and 14.4 is an assumed average of atmospheric pressure.

After the value of the foregoing equation has been obtained for the hour or for the total chart such value will be multiplied by a factor that is the co-efficient or constant of the orifice used in the meter for said period of time to obtain cubic feet. It is obvious that any result obtained by the foregoing processes will relate to relatively large time intervals.

It is an attribute of the improved machine to instantly register the products of square roots automatically taken by the machine for extremely small time intervals.

Far greater accuracy is thus assured than by the foregoing hourly method of calculation. The principle of the machine may be reduced to the following equation:

$$T\left(\frac{\sqrt{P1}\sqrt{D1}+\sqrt{P2}\sqrt{D2}\text{------}+\sqrt{PX}\sqrt{DX}}{X}\right)$$

in which

T equals the number of hours being calculated on the chart.

X equals the number of intervals of time in each hour.

P1, P2 and P3 equal average absolute pressure in pounds during each time interval.

D1, D2 and D3 equal average differential in inches of water during each time interval.

Reference is made to the drawings. A base 1 carries all of the necessary elements of the machine with the exception of a foot controller 2 which is usually located on the floor. The controller is intended to open and close an electrical circuit in which the motor 3 is included.

A prime mover disc 4 and a pressure disc 5 receive driving power from the motor in the following manner:—A belt 6, applied to a pulley 7 on the motor shaft and to a pulley 8 on a primary slide shaft 9 (Fig. 5) drives the disc 4 directly by means of meshing gears 10 and 11 respectively on the shaft 9 and a stud shaft 12. A pressure wheel 13, bearing on the disc 4 and havir, associated meshing gears 14 and 15 respectively on the counter and stub shafts 16 and 17, drives the pressure disc 5 by contact with the disc 4. The driving of the disc 5 by the motor 3 is indirect.

Brackets 18 and 19 provide supports for the shaft 9. It is revoluble in both brackets and additionally slidable in the bracket 19. When it slides a spline 20 maintains a driving connection with the pulley 8 and a worm 21. A slot 22 in the shaft receives the spline.

The bracket 19 is secured to the base 1 and remains stationary. It is upon this bracket that the stub shaft 17 is journaled and the counter shaft 16 is attached. The pressure wheel 13 remains in a relatively stationary position but the prime mover disc 4 is shiftable in respect to the wheel 13 so that various rotary speeds may be imparted to the pressure disc 5.

A gear 23 (Figs. 5 and 6) is driven by the worm 21. This gear is fixed on one end of a drive shaft 24, the other end of which carries a worm pinion 25 in mesh with the gear 26 on the upright shaft 27 of a circular chart plate 28. It is to this plate that a chart 29 (Fig. 1) is attached by any appropriate securing or clamping means. This chart has pressure and differential curves P and D which were inscribed thereon through the instrumentalities of any known gas orifice meter. The pressure curve P is inscribed in black ink, and the differential curve D appears in red ink.

The disc 4 is shiftable, and the manner in which it is shiftable is as follows: It has been stated that the primary shaft 9 slides in the bracket 19. Inasmuch as that shaft is virtually carried by the bracket 18 it follows that the bracket 18 may be the element by which sliding motion is imparted. The bracket 18 is a carriage. It is mounted upon a pair of guide rods 30 (Figs. 5 and 6) which, in turn, are spaced from the base 1 by supports 31 and 32, the latter of which acts as an additional support for the shaft 9 and a stop which keeps the pulley 8, spline 20 and worm 21 in position. The bracket 19 serves as an opposing stop.

A bracket 33 provides a bearing for a pair of levers 34 and 35, the first of which is known as the pressure lever. This lever is associated with the pressure curve P. The other is known as the differential lever, and it is associated with the differential curve D. The pressure lever 34 joins a rocker 36 (Fig. 6) through a link 37. The rocker is pivoted at one end on the base at 38 while the free end is connected to a link 39 with the bracket or carriage 18. Back and forth movements of the pressure lever 34 will cause corresponding movements of the carriage 18 upon the guide rods 30, with a corresponding shifting of the disc 4 back and forth beneath the pressure wheel 13.

A differential wheel 40 bears on the pressure disc 5. It is carried by an arm 41 which has hubs 42 and 43 at the extremities (Fig. 1), the first carrying the extension tube 44 of a counter 45, the second receiving a differential slide rod 46 to which it is secured by a pin 47. A shaft 48 (Fig. 1) makes driving connection of the differential wheel 40 with the counter 45.

An extension 49 of the bracket 19 provides bearings in which the rod 46 may slide. A portion 50 reaching from the extension 49 provides a bearing for the upper end of a standard 51. The lower end of the standard is received by a step bearing 52 on the base. The ultimate object of sliding the differential rod 46 is to shift the differential wheel 40 in respect to the pressure disc 5, it being obvious by this time that the departure of either wheel 13 or 40 from the centers of the respective discs 4 and 5 will result in an increase of rotary speed first in the wheel 13 and discs 5, then in the differential wheel 40.

The manner in which the rod 46 is slid and the wheel 40 shifted in respect to the pressure disc 5 is as follows: A pendent arm 53, fixed upon the rod 46 or its appurtenances, reaches down to a point of connection with a link 54 (Figs. 1 and 6). That link joins one arm of a bell crank 55, the other arm of which has connection by a link 56 with the differential lever 35 mentioned before. The bell crank is pivoted at 57 on the base. Back and forth movement of the differential lever will result in a lateral sliding of the rod 46 in its bearings with a corresponding motion of the arm 41 and wheel 40 (Fig. 1) in respect to the pressure disc 5.

Black and red lead pencils 58 and 59 will mark on the chart 29 as the plate 28 revolves from beneath. The points of the pencils are intended to follow the pressure and differential curves P and D (Fig. 1), and it is primarily by means of the levers 34 and 35 that they are impelled to do so. The accuracy with which the curves are followed depend upon the adeptness of the operator, but the motor 3 may be speeded up or slowed down as much as desired so that the operator will have no trouble in following the intricacies of the curves. All this is made plain in the description of the operation.

A pressure arm 60 carries the black pencil 58. A differential arm 61 carries the red pencil 59. The means by which the pencils is carried is the same in both instances, and the details in respect to the arm 60 in Figure 7 are common. The free extremity of the arm 60 (Fig. 7) is recessed at 62 to receive the head 63 of a staff 64 that terminates in a tapering sleeve 65. The lead pencil binds in this sleeve when inserted. The head is suitably swivelled in the recess 62 so that contact of the pencil with the chart is maintained by gravity.

The pressure pencil 58 is swung in radial directions in respect to the chart plate shaft 27 in the following manner: Secured to the carriage 18 as at 66 is a pressure square root cam 67 (Figs. 3 and 6). A follower bell crank 68 (Fig. 6) pivoted at 69, has a roller 70 bearing on the working edge of the curve.

The short arm 71 of the bell crank has connection through a link 72 with an arm 73 protruding from a hub 74 loose on the standard 51. The arm 73 is struck on the arc of a circle with a radius equal to the length of the link 72. The right hand end of the link is provided with a removable pin 98 which fits in any one of a plurality of equally spaced holes 99 in the arm 73. A spring 75 acts through the various articulated connections mentioned, to keep the follower roller 70 in contact with the cam 67.

A support 76 (Figs. 2 and 4) extending from the hub 74 carries the pressure arm 60. The two are secured together as indicated. A washer 77, or other formation on the standard 51, provides a rest for the hub. The hub is capable of movement independent of the standard 51, it being clear, by tracing the various articulated connections in Figure 6 that a rocking of the pressure lever 34 will shift the carriage 18 and ultimately rock the hub 74 by means of the action of the square root cam 67 against the follower roller 70 so that the pressure pencil 58 (Fig. 1) is caused to swing over the chart 29.

The differential pencil 59 is swung in radial directions in respect to the chart plate shaft 27 in the following manner: Secured to the slide rod 46 is the differential square root cam 78 against the working edges of which the roller 79 of a follower arm 80 is held by a spring 81 attached at its ends to the arm and the portion 50. The arm is secured to the standard 51 so that movement of the arm will rock the standard. Such rocking will not affect the hub 74 because this is loose on the standard.

A bracket 82, secured to the standard 51, carries the differential arm 61, so that rocking of the standard will swing the arm 61. By again tracing the articulated connections in Figure 6 it is readily seen that rocking of the differential lever 35 will slide the rod 46 (Fig. 1) and wheel 40 laterally and move the cam 78 in respect to the follower roller 79. The latter is forced to follow the cam, and rocking motion of the standard 51 results. Inasmuch as the differential arm 61 is carried by the standard it follows that the differential pencil 59 will be made to swing over the chart.

Briefly reverting to the articulated connections between the pressure cam 67 and pencil 58 it is to be noted that the distance of each hole 99 in the arm 73 (Figs. 1 and 6) from the center of the standard 51 is proportional to the chart to be figured when using that hole.

In other words, the link 72 is subject to adjustment so that various maximum pressure charts may be accommodated. One hole is provided for 500 pound pressure charts, another for 250 pound pressure charts, another for 100 pound pressure charts and so forth.

Provision is made for automatically limiting the time period for which the value of the extension is to be computed, whether for the duration of the entire chart 29 or any quarter-hour portion thereof. The manner in which this is accomplished is as follows: A time control handle 83 has bearing on the center post or upright shaft 27 of the chart plate, and extends to a point beyond the rim of the plate not only to make it accessible, but also to place the button 84 of a latch 85 in convenient reach.

The handle 83 is composed of spring steel, and tends to spring upwardly toward the bottom of the plate 28. The latter has a pendent circular flange 86 that is divided into a plurality of teeth 87 with which a lug 88 on the handle is engageable to maintain a given setting of the handle. There are 96 teeth, representing quarter-hour intervals of a twenty-four-hour chart. The exposed end of the handle has a pointer 89 that reaches over the edge of the chart. By pressing down on the free end of the handle and turning the latter to the extent desired, the pointer may be made to indicate that place on the chart 29 up to which a given calculation is to extend.

Both the handle 83 and latch 85 fit between the teeth 87 as plainly shown in Figure 8. The latch is pivoted on the handle at 90. The handle 83 has a bumper 91 which will ultimately engage a fixed stop 92 (Fig. 6) to stop the machine. The bumper 91 is of such shape (Fig. 8) that it may be made to pass the stop 92 upon a limited depression of the spring handle 83, but at such time the latch 85 will remain in engagement with the teeth 87 unless the button 84 is depressed also.

There is a purpose in the double check upon the position of the pointer 89. The retention of the latch 85 in a given space between the teeth on the chart plate 28 insures the return of the handle 83 to the proper space after the handle has been depressed to pass the stop 92 as stated. If the button 84 is depressed both the handle 83 and the latch 85 will be disengaged from the teeth 87 so that the entire assembly of the handle 83 may be rotated freely under the chart plate.

It is one of the functions of the bumper 91 to open the circuit 93 (Fig. 6) of the motor 3. To that end it has an associated cut out switch comprising a plunger 94 movable on the stop 92, a contactor 95 movable with the plunger, and a fixed contact 96 with which the contactor ordinarily engages. The approach of the bumper 91 will first operate the cut out switch and then strike the stop 92 whereupon the chart plate 28 will come to rest.

By reference to Figure 5 it will be seen that the upper face of each disc 4 and 5 is sunken in order to receive rubber or other frictional mats 97. These mats are designed to improve the frictional contact of the wheels 13 and 40 with the discs. Relative slippage would not be desired, and the rubber inserts will prevent that.

The operation is as follows: A chart 29, having pressure and differential curves P and D previously inscribed thereon in black and red ink respectively through the instrumentalities of any known orifice or Venturi meter, is placed on the circular chart plate 28 and secured in position.

The chart is turned until that one of the ordinates of the chart, representing the starting point, is brought beneath the points of the black and red pressure and differential pencils 58 and 59. The pencils are lowered upon the chart.

Set the time control handle 83 to a stopping point on the chart. The pointer 89 is used as the indicator of that point. Depression of the button 84 releases both the latch 85 and handle 83 from the teeth 87 beneath the chart plate 28 so that the pointer 89 may be swung to the stopping point desired. That stopping point may occur at any of the 96 quarter-hour intervals into which the chart is divided and which are provided for by the teeth 87.

Grasp the pressure and differential levers 34 and 35 by the right and left hand. Depress the foot controller 2 in order to start the machine.

The drive of the motor 3 may be followed through the belt 6 (Fig. 2), primary slide shaft 9 to the prime mover disc 4, and the drive shaft 24 (Fig. 6) to the upright shaft 27 of circular chart plate 28 (Figs. 1, 2 and 6). Both the pressure and differential curves are followed simultaneously by the pencil points, the black pencil tracing over the pressure curve and the red pencil tracing over the differential curve, thus leaving penciled curves on the chart by which the accuracy of the tracing may be checked.

By moving levers 34 and 35 the pencils are forced to follow the foregoing curves. The machine speed is varied by the foot controller 2 to accommodate the intricacies of the curves. As the time control handle 83 approaches the stop 92 (Fig. 6) there will first be an opening of the motor circuit 93 by displacement of the plunger 94 and separation of the contactor and contacts and, second, a total stopping of the machine by the engagement of the bumper 91 with the stop 92.

Rocking of the pressure lever 34 (Fig. 6) will slide the carriage 18 upon the guide rods 30 thus to shift the prime mover disc 4 (Fig. 5) in one direction in respect to the relatively fixed pressure wheel 13. The speed of the wheel 13 will be varied accordingly as the center of the disc 4 is made to depart from or approach the pressure wheel.

Variations in the speed of the pressure wheel result in variations in the speed of the pressure disc 5. Movements of the differential lever 35 will shift the slide rod 46 in any direction and cause the differential wheel 40 to traverse the face of the disc.

The distance of wheels 13 and 40 from the centers of the discs 4 and 5 respectively, will be proportional to the square root of the absolute pressure being registered at that given instant by the pressure pencil 58, and to the square root of the differential pressure being registered by the differential pencil 59. Then, as the prime mover disc 4 is moving at a certain rate, which may be said to represent the factor time, the pressure wheel 13 will be moving at a rate which is some direct multiple of time $x$ square root of absolute pressure.

Also, inasmuch as the pressure disc 5 is geared to the pressure wheel 13 it follows that the disc 5 will be moving at a rate proportional to the foregoing formula. As the differential wheel 40 is at a distance from the center of the disc 5 proportional to the square root of the differential pressure at the instant under consideration, it follows that wheel 40 will revolve at a rate which is some multiple of time $x$ square root of absolute pressure $x$ square root of differential pressure. It should be understood that the factor time mentioned before, is infinitely small, and that theoretically the machine performs the foregoing multiplication each instant that it is in operation.

Each calculation will be separate and distinct from any other calculation, and the product from each calculation is continuously registered by the counter 45 as an addition to the total of the previous products registered. On referring to the actual machine formula given earlier in this description, the reader will see that the foregoing outline agrees with the formula used, the value T divided by X representing the direct multiple factor mentioned above.

Swinging of the pencils 58 and 59 over the chart occurs during the shifting movements of the disc 4 and wheel 40 by virtue of the operation of the pressure and differential cams 67 and 78 (Figs. 6 and 1) against the bell crank 68 and follower arm 80. There will be a direct reading on the counter 45. This reading is designed to state the result in tenths of the desired extension. The counter will register only the extension of the chart in tenths, and the division of the counter reading by 10 will give the desired extension of the chart.

Every movement of the pressure and differential levers 34 and 35 is reflected through the cams 67 and 78 in the pencils 58 and 59. The contours of these cams are not to be considered as true curves, for the true curves, in each instance, is the integral curve between a true square root curve and the arcs of the various levers and links between the respective curves and the pencils 58 and 59. The cams 67 and 78 have only a limited square root range, depending on the type of chart to be handled by the machine.

The drawings are based on the dimensions of a machine to handle charts of either 250 or 500 pounds maximum pressure and 50 inches of water maximum differential. For other pressure ranges or differential ranges the machine gearing, cams, etc., would have to be adapted to suit the specific requirements.

It will be noted that the counter 45 is driven from the prime mover 3 by a driving connection which includes two separate means to vary the driving ratio of the counter. That is, the ratio of the driving connection is variable in accordance with the radial position of the carriage 18 supporting prime mover disk 4, and also in accordance with the radial position of the carriage supporting the differential wheel 40. Each of these two separate means to vary the driving ratio of the counter is independently operable by handles 34 and 35.

Further it will be noted that the styli 58 and 59 are not directly mechanically connected to the two mechanisms for varying the driving ratio of the counter but on the contrary the styli merely follow-up the movements of the carriages by engagement of the arms 68 and 80 against cams 67 and 78 by their springs. Thus the styli follow movements of the carriages and reflect on the chart the varying positions of the carriages. The cams 68 and 80 and the lever arms are so designed that the styli indicate on the chart the square of the ratio of the drive.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A calculating machine comprising a chart plate, a counter, actuating means for the counter, a prime mover to simultaneously drive the chart plate and said actuating means, tracing means to follow a curve inscribed on a chart carried by the chart plate as the latter revolves, and a cam which in causing the tracing means to follow the fluctuations of said curve also causes variations in the speed of the actuating means and rate at which numerical values are compiled in the counter.

2. A calculating machine comprising a chart plate, a counter, actuating means for driving the counter, a prime mover for revolving the chart plate and operating the actuating means, a stylus for tracing a curve inscribed on a chart carried by the chart plate as the latter revolves, means to shift the actuating means thus to variably drive the counter, a cam of determined design shiftable with said last means, and articulated connections between said cam and stylus so that the amount of shifting of said last named means will be made to depend upon the fluctuations of said curve.

3. A calculating machine comprising a chart plate to carry a chart having inscribed pressure and differential curves, styli to follow the respective curves, prime mover and pressure discs having frictional inserts, a pressure wheel in contact with the prime mover disc and having means to drive the pressure disc, a counter having a drive wheel in contact with the pressure disc, a prime mover for the chart plate and prime mover disc, independent follower means carrying the styli, and instrumentalities acting through the follower means to cause the styli to follow the fluctuations of the curves and vary the speed of the pressure wheel and counter drive wheel but permit the continuous compilation of numerical values in the counter.

4. A calculating machine comprising a chart plate to carry a chart having inscribed pressure and differential curves, independent follower means having styli to trace the curves, a counter having a drive wheel, a prime mover disc, a pressure disc on which the drive wheel bears contact and having a pressure wheel bearing on the prime mover disc, means to revolve the chart plate and drive the latter disc, shifting means associated with one of the follower means for shifting the prime mover disc as the pressure curve is traced by one stylus thus to vary the speed of the pressure wheel, and shifting means associated with the other follower means for shifting the counter drive wheel as the differential curve is traced by the other stylus thus to vary the speed of said drive wheel.

5. A calculating machine comprising a chart plate to carry a chart having an inscribed curve, a driven disc and a prime mover for the disc and chart plate, a counter having a drive wheel bearing on the disc, slidable means carrying the counter and drive wheel, a pivoted arm having a stylus, a lever with articulated connections to the slidable means for shifting the drive wheel over the face of the disc, and a cam associated with the slidable means and arm, governing the extent of shifting of the drive wheel accordingly as the stylus follows the undulations of the curve.

6. A calculating machine comprising a chart plate to carry a chart having an inscribed curve, a driven disc and a prime mover for the disc and chart plate, a counter having a drive wheel bearing on the disc, a slide rod having an arm carrying the counter and drive wheel, a pivoted arm having a stylus, a lever with connections to slide the slide rod and shift the drive wheel over the face of the disc, and a cam shifted as the rod is slid allowing the arm to swing so that the stylus may follow the curve and serving as an index of the extent of shifting of the drive wheel.

7. A calculating machine comprising a chart wheel carrying a chart having inscribed pressure and differential curves, a counter having a drive wheel, a prime mover disc and a prime mover for revolving the disc and chart plate, a driving element intermediate the disc and wheel, a pair of swingable arms each having a stylus to follow the respective curves, means which serve as carriages respectively for the prime mover disc and for the drive wheel, a pair of levers to shift the respective carriages in diverse directions to the intermediate driving elements, and cams associated with the respective carriages permitting swinging of the arms as the levers are rocked so that the styli may follow the undulations of the curves.

8. A calculating machine comprising a chart plate to carry a chart having inscribed pressure and differential curves, a pair of swingable arms having styli to trace the curves, a counter having a drive wheel, a prime mover disc, an intermediate driving element driven by the disc and driving the wheel, means serving as carriages for the prime mover disc and for the drive wheel, a cam associated with each carriage having a governing connection with the arms, levers to shift the respective carriages in accordance with the nature of the curves so that a variable drive of the drive wheel results, and a motor having means to drive the prime mover disc and the chart plate and having a controller so that the motor speed may be varied in accordance with the intricacies of the curves.

9. A calculating machine comprising a chart plate to carry a chart having an inscribed curve, a driven disc, a prime mover for said disc and chart plate, a counter having a drive wheel bearing on said disc, supporting means to allow said drive wheel to be moved radially of said disc to vary the speed of said wheel, an arm having a stylus adapted to trace the curve on the chart, and connections between said arm and the supporting means for said drive wheel to move said wheel radially of the disc as the stylus follows undulations of the curve to position said wheel at a radial distance proportional to the square root of the quantity represented by the curve.

10. A calculating machine for obtaining the integral of the product of the square roots of two quantities represented by curves, comprising a rotary chart plate adapted to receive a chart having two curves thereon, a drive wheel and indicating means operable thereby, a driven disc upon the surface of which said wheel engages, means to vary the point of engagement between said wheel disc radially with respect to said disc in accordance with the undulations of one curve, and means to vary the speed of said disc in accordance with the undulations of the other curve.

11. A calculating machine for obtaining the integral of the product of the square roots of two quantities represented by curves, comprising a rotary chart plate adapted to receive a chart having two curves thereon, tracing styli manually movable over the chart to trace the curves, a drive wheel and a counter actuated thereby, a driven disc upon the surface of which said drive wheel engages, means to radially adjust said wheel with respect to said disc in accordance with the movements of one stylus, and means for varying the speed of said disc in accordance with the movements of the other sylus.

12. A calculating machine for obtaining the integral of the product of the square roots of two quantities represented by curves, comprising a rotary chart plate adapted to receive a chart having two curves, a drive wheel and an indicating means operable thereby, a driven member frictionally engaging said wheel to drive the same, means for bodily shifting said wheel with respect to said driven member in accordance with the undulations of one curve to thereby vary the speed of said wheel, and means to vary the speed of said driven member in accordance with the undulations of the other curve.

13. A calculating machine for obtaining the integral of the product of the square roots of two quantities represented by curves, comprising a chart plate adapted to receive a chart having two curves thereon, arms carrying styli to follow the respective curves, a prime mover disc, a pressure disc, driving means between said discs, a counter having a drive wheel in engagement with the pressure disc, and means to vary the driving means between said discs and to vary the radial position of said drive wheel with respect to said pressure disc in accordance with the movements of said styli.

14. A calculating machine for obtaining the integral of the product of the square roots of two quantities represented by curves, comprising a chart plate adapted to receive a chart having two curves thereon, arms carrying styli to follow the respective curves, a prime mover disc, a pressure disc, driving means between said discs including a friction wheel engaging one disc, a counter having a drive wheel in engagement with the pressure disc, means operable simultaneously with one stylus-carrying arm to move said drive wheel radially of the pressure disc, and means operable simultaneously with the other stylus-carrying arm to move said friction wheel of the driving means radially of the disc it engages to vary the speed of the pressure disc.

15. A calculating machine comprising a chart plate adapted to receive a chart having differential and static pressure curves thereon, an arm carrying a stylus adapted to follow the differential pressure curve, an arm carrying a stylus adapted to follow the static pressure curve, an indicator, means to operate said indicator to indicate thereon the integral of the product of the square roots of the static and differential pressures in accordance with undulations of the curves, and an adjustable connection between said static pressure stylus arm and said means whereby charts having widely variant static pressure ranges may be correctly integrated.

16. The invention as defined in claim 15 wherein said adjustable connection comprises a member having openings therein corresponding to various static pressure ranges, and a removable pin for engagement in any one of said openings.

17. A calculating machine for obtaining the integral of the product of the square roots of two quantities represented by curves, comprising a chart plate adapted to receive a chart having two curves thereon, a counter, two styli, each adapted to follow one curve, a driver prime mover, a driving connection between said prime mover and said counter, and two independent means for separately varying said driving connection to vary the speed of said counter, each of said means being variable in accordance with movements of one stylus.

18. A calculating machine for obtaining the integral of the product of the square roots of two quantities represented by curves, comprising a chart plate adapted to receive a chart having two curves thereon, a counter, two styli each adapted to follow one curve, a driven prime mover, a driving connection between said prime mover and said counter, means operable by movements of one stylus to vary said driving connection to thereby vary the speed of said counter in accordance with undulations of one curve, and means operable by movements of the other stylus to independently vary said driving connection at another point to also vary the speed of said counter in accordance with undulations of the other curve.

19. A calculating machine for obtaining the integral of the product of the square roots of two quantities represented by curves, comprising a rotary plate adapted to receive a chart having curves thereon, two styli each adapted to follow a curve, a counter, a prime mover for driving said counter and said chart plate, means for varying the speed of said counter by movements of both styli in following their respective curves, and stop mechanism for stopping said chart plate when a predetermined portion of the curves thereon has been integrated.

20. The invention as defined in claim 19 wherein the stop mechanism comprises an adjustable handle movable from a start position to any predetermined stop position.

21. The invention as defined in claim 19 wherein said stop mechanism comprises an adjustable handle normally engaged with and rotatable with the chart plate, said handle being disengageable from the chart plate for movement to any predetermined stop position.

22. A calculating machine for obtaining the integral of the product of the square roots of two quantities represented by two curves, comprising a chart plate adapted to receive a chart having two curves thereon, a prime mover for driving said chart plate, a counter, a variable ratio driving connection between said prime mover and said counter, two independent means for separately varying the ratio of said driving connection, a stylus adapted to follow each curve, and follow-up mechanism to cause each stylus to reflect movements of one of said two independent means.

23. A calculating machine for obtaining the integral of the product of the square roots of two quantities represented by two curves, comprising a chart plate adapted to receive a chart having two curves thereon, a prime mover for driving said chart plate, a counter, a variable ratio driving connection for said counter, two independent means for separately varying the ratio of the said driving connection, a stylus adapted to follow each curve, and follow-up mechanism to cause the position of each stylus on the chart to reflect the square of the ratio of the driving connection of one of said two independent means.

24. A calculating machine for obtaining the integral of the product of the square roots of two quantities represented by two curves, comprising a chart plate adapted to receive a chart having two curves thereon, a prime mover for driving said chart plate, a counter, a stylus adapted to follow each curve, a variable ratio driving connection between said prime mover and said counter, two independent means for varying the ratio of said driving connection, manual means for separately operating said two independent means, and follow-up mechanism to cause each stylus to reflect movements of one of said two independent means.

25. A calculating machine for obtaining the integral of the product of the square roots of two quantities represented by two curves, comprising a chart plate adapted to receive a chart having two curves thereon, a prime mover for rotating said chart plate, a counter, a variable ratio driving connection between said prime mover and counter, two independently movable carriages, each carriage varying the driving ratio between said counter and prime mover in accordance with its position, manual means for separately moving said carriages, two styli each adapted to follow a curve on the chart, and a follow-up mechanism to cause each stylus to reflect on the chart the square of driving ratio as determined by the position of one carriage.

26. A calculating machine comprising chart advancing means adapted to cooperate with a chart having two curves thereon, a counter, styli each adapted to follow one curve, a prime mover, a driving connection between said prime mover and said counter, means operable by movements of one stylus to vary said driving connection to thereby vary the speed of said counter in accordance with the undulations of one curve, and means operable by movement of the other stylus to independently vary said driving connection at another point to also vary the speed of said counter in accordance with undulations of the other curve.

27. A calculating machine comprising chart advancing means, a counter, actuating means for the counter, a prime mover to simultaneously operate said chart advancing means and said actuating means, tracing means to follow a curve inscribed on a chart cooperating with said chart advancing means as the latter advances said chart, and a cam, which in causing the tracing means to follow the fluctuation of said curve, also causes variations in the speed of the actuating means and the rate at which numerical values are compiled in the counter.

28. A calculating machine comprising chart advancing means, adapted to cooperate with a chart having two curves thereon, a prime mover disc, means for simultaneously operating said chart advancing means and said disc, a movable carriage carrying a rotatable pressure member in contact with the surface of said disc, a stylus for tracing a curve on the chart, connecting means between said stylus and said carriage including a motion modifying member whereby the peripheral motion of said rotatable pressure member is modified in accordance with said curve, a second movable carriage carrying a counter wheel operated by the peripheral motion of said rotatable pressure member, a second stylus for tracing the other curve on the chart, connecting means between the second stylus and the second carriage including a motion modifying member whereby the peripheral motion of said rotatable pressure member is modified in transmission to said counter wheel in accordance with said second curve, and a counter for registering the revolutions of said counter wheel.

29. A calculating machine comprising a chart plate adapted to receive a chart having a curve inscribed thereon, an indicator, actuating means for the indicator, a prime mover to simultaneously drive the chart plate and said actuating means, a cam, tracing means coacting with said cam to follow said curve and means for manually shifting said cam to cause the tracing means to follow the fluctuations of the curve and cause predetermined variations in the speed of the indicator actuating means.

30. In a calculating machine for charts indicating volumes of flow passing through a meter at variable pressures, a driven disc; a friction wheel operatively associated with said disc and mounted for movement in the plane of said disc; and means associated with said mounting for shifting the axis of said friction wheel during its movement to maintain the same parallel to radii of said disc whereby the contact surface speeds of said friction wheel and said disc are maintained equal.

31. A calculating machine comprising a movable chart plate adapted to receive a chart having a static pressure curve thereon, an arm carrying a stylus adapted to follow the static pressure curve, an indicator, means variably driven in accordance with the movement of said stylus to register on said indicator the square root of the integral of the static pressure curve, and an adjustable connection between said means and said arm whereby the stylus and means may be relatively adjusted to compensate for various zero positions of curves for various static pressure range charts.

32. A calculating machine for integrating charts comprising a rotary plate adapted to receive a chart having curves thereon, a pair of tracing pen arms adapted to follow said curves, an indicator, means variably driven in accordance with the movement of said arms to register on said indicator the product of the square root of the integrals of said curves, an electric motor for driving said plate and said means, and a stop mechanism for stopping said chart plate when a predetermined portion of said curves have been integrated, a motor switch and means operatively connected with said stop mechanism for cutting out said motor switch upon actuation of said stop mechanism.

JOHN B. McGAUGHY.